US012773881B2

(12) United States Patent
Shimizu et al.

(10) Patent No.: US 12,773,881 B2
(45) Date of Patent: Oct. 27, 2026

(54) PNEUMATIC TIRE

(71) Applicant: The Yokohama Rubber Co., LTD., Tokyo (JP)

(72) Inventors: Kazunori Shimizu, Kanagawa (JP); Hiroshi Hata, Kanagawa (JP)

(73) Assignee: The Yokohama Rubber Co., LTD., Tokyo (JP)

(*) Notice: Subject to any disclaimer, the term of this patent is extended or adjusted under 35 U.S.C. 154(b) by 413 days.

(21) Appl. No.: 17/756,992

(22) PCT Filed: Dec. 3, 2020

(86) PCT No.: PCT/JP2020/045120
§ 371 (c)(1),
(2) Date: Jun. 7, 2022

(87) PCT Pub. No.: WO2021/117612
PCT Pub. Date: Jun. 17, 2021

(65) Prior Publication Data

US 2023/0019388 A1 Jan. 19, 2023

(30) Foreign Application Priority Data

Dec. 12, 2019 (JP) ................................ 2019-224705

(51) Int. Cl.
*B60C 1/00* (2006.01)
*B60C 13/00* (2006.01)

(52) U.S. Cl.
CPC ............ *B60C 13/00* (2013.01); *B60C 1/0025* (2013.01); *B60C 2013/006* (2013.01); *B60C 2013/007* (2013.01)

(58) Field of Classification Search
CPC .................................................... B60C 1/0025
See application file for complete search history.

(56) References Cited

U.S. PATENT DOCUMENTS 5,173,525 A * 12/1992 De Servi .................. C08K 3/24 524/548
2002/0095008 A1* 7/2002 Heinrich .................. C08K 9/04 524/442
(Continued)

FOREIGN PATENT DOCUMENTS

CN 1120050 * 4/1996
EP 0652117 * 5/1995
(Continued)

OTHER PUBLICATIONS

Machine translation of EP 0652117, 1995.*
(Continued)

*Primary Examiner* — Justin R Fischer
(74) *Attorney, Agent, or Firm* — Thorpe North & Western

(57) ABSTRACT

In this pneumatic tire, a tan δ value T20 of a rubber member, which constitutes at least one of a bead filler, an undertread, a sidewall rubber, and a rim cushion rubber, at 20° C. and a tan δ value T60 of the rubber member at 60° C. satisfy 0.50≤T20/T60≤2.00 and T20≤0.22. Additionally, the tan δ value T20 of the rubber member at 20° C. is in a range T20≤0.15. Additionally, a tan δ value T20_*sw* of the sidewall rubber at 20° C. and a tan δ value T60_*sw* of the sidewall rubber at 60° C. satisfy 0.50≤T20_*sw*/T60_*sw*≤1.50 and T20_*sw*≤0.11.

13 Claims, 5 Drawing Sheets

(56) References Cited

U.S. PATENT DOCUMENTS

| | | | | |
|---|---|---|---|---|
| 2008/0097024 | A1 | 4/2008 | Chen | |
| 2010/0069529 | A1* | 3/2010 | Resmini | C08L 7/00 524/522 |

FOREIGN PATENT DOCUMENTS

| | | | |
|---|---|---|---|
| EP | 0 738 614 | A1 | 10/1996 |
| JP | 1-174547 | A | 7/1989 |
| JP | 5-25327 | * | 2/1993 |
| JP | 5-169928 | * | 7/1993 |
| JP | 5-169928 | A | 7/1993 |
| JP | 7-61214 | A | 3/1995 |
| JP | H08-302072 | A | 11/1996 |
| JP | 2004-136863 | A | 5/2004 |
| JP | 2009-280123 | A | 12/2009 |
| JP | 2011-140258 | A | 7/2011 |
| JP | 5998310 | B1 | 9/2016 |
| WO | WO 212/002521 | * | 1/2012 |
| WO | 2018/193700 | A1 | 10/2018 |
| WO | 2019/045062 | A1 | 3/2019 |

OTHER PUBLICATIONS

D. Zalmova et al., Elastomeric Matrix Composites: Effect of Processing Conditions on the Physical, Mechanical and Viscoelastic Properties, Journal of Achievements of Materials and Manufacturing Engineering, Feb. 2012, 12 pgs., vol. 50 Issue 2, World Press.

* cited by examiner

| | Conventional Example | Example 1 | Example 2 | Example 3 | Example 4 |
|---|---|---|---|---|---|
| T0_ct | 0.50 | 0.50 | 0.50 | 0.50 | 0.79 |
| T20_ct | 0.21 | 0.21 | 0.21 | 0.21 | 0.34 |
| T40_ct | 0.18 | 0.18 | 0.18 | 0.18 | 0.29 |
| T60_ct | 0.15 | 0.15 | 0.15 | 0.15 | 0.20 |
| T20_ut | 0.16 | 0.16 | 0.16 | 0.16 | 0.09 |
| T60_ut | 0.07 | 0.07 | 0.07 | 0.07 | 0.06 |
| T20_sw | 0.13 | 0.11 | 0.09 | 0.07 | 0.11 |
| T60_sw | 0.11 | 0.11 | 0.11 | 0.11 | 0.07 |
| T20_rc | 0.24 | 0.24 | 0.24 | 0.24 | 0.22 |
| T60_rc | 0.18 | 0.18 | 0.18 | 0.18 | 0.17 |
| T20_bf | 0.19 | 0.19 | 0.19 | 0.19 | 0.18 |
| T60_bf | 0.18 | 0.18 | 0.18 | 0.18 | 0.19 |
| T0_ct/T60_ct | 3.33 | 3.33 | 3.33 | 3.33 | 4.39 |
| T20_ct/T60_ct | 1.40 | 1.40 | 1.40 | 1.40 | 1.70 |
| T20_ut/T60_ut | 2.29 | 2.29 | 2.29 | 2.29 | 1.50 |
| T20_sw/T60_sw | 1.18 | 1.00 | 0.82 | 0.64 | 1.50 |
| T20_rc/T60_rc | 1.33 | 1.33 | 1.33 | 1.33 | 1.29 |
| T20_bf/T60_bf | 1.06 | 1.06 | 1.06 | 1.06 | 0.95 |
| T0_ct x T20_sw | 0.065 | 0.055 | 0.045 | 0.035 | 0.087 |
| T40_ct x T60_sw | 0.020 | 0.020 | 0.020 | 0.020 | 0.021 |
| (T20_sw/T60_sw)/(T20_ut/T60_ut) | 0.52 | 0.44 | 0.36 | 0.28 | 1.00 |
| (T20_sw/T60_sw)/(T20_ct/T60_ct) | 0.84 | 0.71 | 0.58 | 0.45 | 0.88 |
| (T20_rc/T60_rc)/(T20_sw/T60_sw) | 1.13 | 1.33 | 1.63 | 2.10 | 0.86 |
| (T20_bf/T60_bf)/(T20_sw/T60_sw) | 0.89 | 1.06 | 1.29 | 1.66 | 0.63 |
| Hs_ct | 61 | 61 | 61 | 61 | 62 |
| Hs_ut | 61 | 61 | 61 | 61 | 57 |
| Hs_sw | 48 | 48 | 48 | 48 | 49 |
| Hs_rc | 72 | 72 | 72 | 72 | 69 |
| Hs_bf | 78 | 78 | 78 | 78 | 89 |
| Hs_ct - Hs_sw | 13 | 13 | 13 | 13 | 13 |
| Hs_rc - Hs_sw | 24 | 24 | 24 | 24 | 20 |
| Hs_bf - Hs_sw | 30 | 30 | 30 | 30 | 40 |
| Ga_sw x T20_sw[mm] | 0.34 | 0.34 | 0.34 | 0.34 | 0.33 |
| La[mm] | 65 | 65 | 65 | 65 | 70 |
| Ordinary temperature rolling resistance | 100 | 100 | 100 | 100 | 105 |
| Low temperature rolling resistance | 100 | 101 | 102 | 103 | 107 |
| Wet performance | 100 | 100 | 100 | 100 | 99 |
| Steering stability performance | 100 | 100 | 100 | 100 | 101 |

FIG. 4A

| | Example 5 | Example 6 | Example 7 | Example 8 | Example 9 |
|---|---|---|---|---|---|
| T0_ct | 0.79 | 0.69 | 0.69 | 0.75 | 0.69 |
| T20_ct | 0.32 | 0.30 | 0.30 | 0.32 | 0.30 |
| T40_ct | 0.29 | 0.25 | 0.25 | 0.27 | 0.25 |
| T60_ct | 0.20 | 0.18 | 0.18 | 0.19 | 0.18 |
| T20_ut | 0.09 | 0.09 | 0.09 | 0.09 | 0.09 |
| T60_ut | 0.06 | 0.06 | 0.06 | 0.06 | 0.06 |
| T20_sw | 0.09 | 0.09 | 0.09 | 0.11 | 0.09 |
| T60_sw | 0.06 | 0.06 | 0.06 | 0.07 | 0.06 |
| T20_rc | 0.22 | 0.22 | 0.22 | 0.22 | 0.22 |
| T60_rc | 0.17 | 0.17 | 0.17 | 0.17 | 0.17 |
| T20_bf | 0.18 | 0.18 | 0.18 | 0.18 | 0.18 |
| T60_bf | 0.19 | 0.19 | 0.19 | 0.19 | 0.19 |
| T0_ct/T60_ct | 4.39 | 4.31 | 4.31 | 4.35 | 4.31 |
| T20_ct/T60_ct | 1.60 | 1.67 | 1.67 | 1.68 | 1.67 |
| T20_ut/T60_ut | 1.50 | 1.50 | 1.50 | 1.50 | 1.50 |
| T20_sw/T60_sw | 1.43 | 1.43 | 1.43 | 1.49 | 1.43 |
| T20_rc/T60_rc | 1.29 | 1.29 | 1.29 | 1.29 | 1.29 |
| T20_bf/T60_bf | 0.95 | 0.95 | 0.95 | 0.95 | 0.95 |
| T0_ct x T20_sw | 0.071 | 0.062 | 0.062 | 0.083 | 0.062 |
| T40_ct x T60_sw | 0.018 | 0.016 | 0.016 | 0.020 | 0.016 |
| (T20_sw/T60_sw)/(T20_ut/T60_ut) | 0.95 | 0.95 | 0.95 | 0.99 | 0.95 |
| (T20_sw/T60_sw)/(T20_ct/T60_ct) | 0.89 | 0.86 | 0.86 | 0.88 | 0.86 |
| (T20_rc/T60_rc)/(T20_sw/T60_sw) | 0.90 | 0.90 | 0.90 | 0.87 | 0.90 |
| (T20_bf/T60_bf)/(T20_sw/T60_sw) | 0.66 | 0.66 | 0.66 | 0.64 | 0.66 |
| Hs_ct | 62 | 61 | 61 | 61 | 61 |
| Hs_ut | 57 | 57 | 57 | 57 | 57 |
| Hs_sw | 49 | 52 | 52 | 52 | 52 |
| Hs_rc | 69 | 69 | 69 | 69 | 69 |
| Hs_bf | 89 | 89 | 89 | 89 | 89 |
| Hs_ct - Hs_sw | 13 | 9 | 9 | 9 | 9 |
| Hs_rc - Hs_sw | 20 | 17 | 17 | 17 | 17 |
| Hs_bf - Hs_sw | 40 | 37 | 37 | 37 | 37 |
| Ga_sw x T20_sw[mm] | 0.27 | 0.27 | 0.21 | 0.25 | 0.21 |
| La[mm] | 70 | 70 | 70 | 70 | 55 |
| Ordinary temperature rolling resistance | 106 | 108 | 109 | 106 | 110 |
| Low temperature rolling resistance | 108 | 110 | 111 | 108 | 112 |
| Wet performance | 99 | 105 | 105 | 105 | 105 |
| Steering stability performance | 101 | 102 | 102 | 102 | 102 |

FIG. 4B

PNEUMATIC TIRE

TECHNICAL FIELD

The technology relates to a pneumatic tire and particularly relates to a pneumatic tire that can reduce tire rolling resistance during traveling under a low ambient temperature while suppressing variations in fuel economy performance due to changes in ambient temperature.

BACKGROUND ART

In a known pneumatic tire, by focusing on the fact that the tire temperature during traveling under an ordinary ambient temperature is about 60° C. and setting a tan δ value (loss tangent) of a tread rubber at 60° C. to a low value, the tire rolling resistance is reduced. At the same time, by setting a tan δ value of the tread rubber (particularly, cap rubber constituting a tire ground contact surface) at 0° C. to a high value, the wet performance of the tire is ensured.

However, in the configuration described above, there is a problem that the tire rolling resistance deteriorates during traveling under a low ambient temperature. A technology described in Japan Patent No. 5998310 has been known as a pneumatic tire in the related art that addresses this problem.

On the other hand, the tire rolling resistance changes with changes in ambient temperature during traveling due to a seasonal change or the like. Accordingly, there is a problem that the fuel economy performance of the tire varies due to changes in ambient temperature.

SUMMARY

This technology provides a pneumatic tire that can reduce tire rolling resistance during traveling under a low ambient temperature while suppressing variations in fuel economy performance due to changes in ambient temperature.

A pneumatic tire according to an embodiment of the technology includes: a pair of bead cores; a pair of bead fillers disposed on an outer side in a radial direction of the bead cores; a carcass layer extending between the bead cores; a belt layer disposed on an outer side in the radial direction of the carcass layer; a tread rubber including a cap tread and an undertread and disposed on an outer side in the radial direction of the belt layer; a pair of sidewall rubbers disposed on an outer side in a tire width direction of the carcass layer; and a pair of rim cushion rubbers disposed on an inner side in the radial direction of the pair of bead cores. A tan δ value T20 of a rubber member at 20° C. and a tan δ value T60 of the rubber member at 60° C. satisfy $0.50 \le T20/T60 \le 2.00$ and $T20 \le 0.22$, the rubber member constituting at least one of the bead fillers, the undertread, the sidewall rubbers, and the rim cushion rubbers.

In the pneumatic tire according to an embodiment of the technology, (1) a ratio T20/T60 between the tan δ value T20 of the rubber member at 20° C. and the tan δ value T60 of the rubber member at 60° C. is properly set, and thus the difference between the rolling resistance under a low ambient temperature and the rolling resistance under an ordinary ambient temperature can be reduced. Additionally, (2) the tan δ value T20 of the rubber member at 20° C. is in the range described above, and thus the rolling resistance under a low ambient temperature is reduced. As a result, there is an advantage that the tire rolling resistance during traveling under a low ambient temperature can be reduced while variations in fuel economy performance due to changes in ambient temperature are suppressed.

BRIEF DESCRIPTION OF THE DRAWINGS

FIGS. 4A-4B include a table showing the results of performance tests of pneumatic tires according to embodiments of the technology.

DETAILED DESCRIPTION

Embodiments of the technology will be described in detail below with reference to the drawings. Note that the technology is not limited to the embodiments. Additionally, constituents of the embodiments include constituents that are substitutable and are obviously substitutes while maintaining consistency with the embodiments of the technology. Additionally a plurality of modified examples described in the embodiments can be combined in a discretionary manner within the scope apparent to one skilled in the art.

Pneumatic Tire

Figure 1:
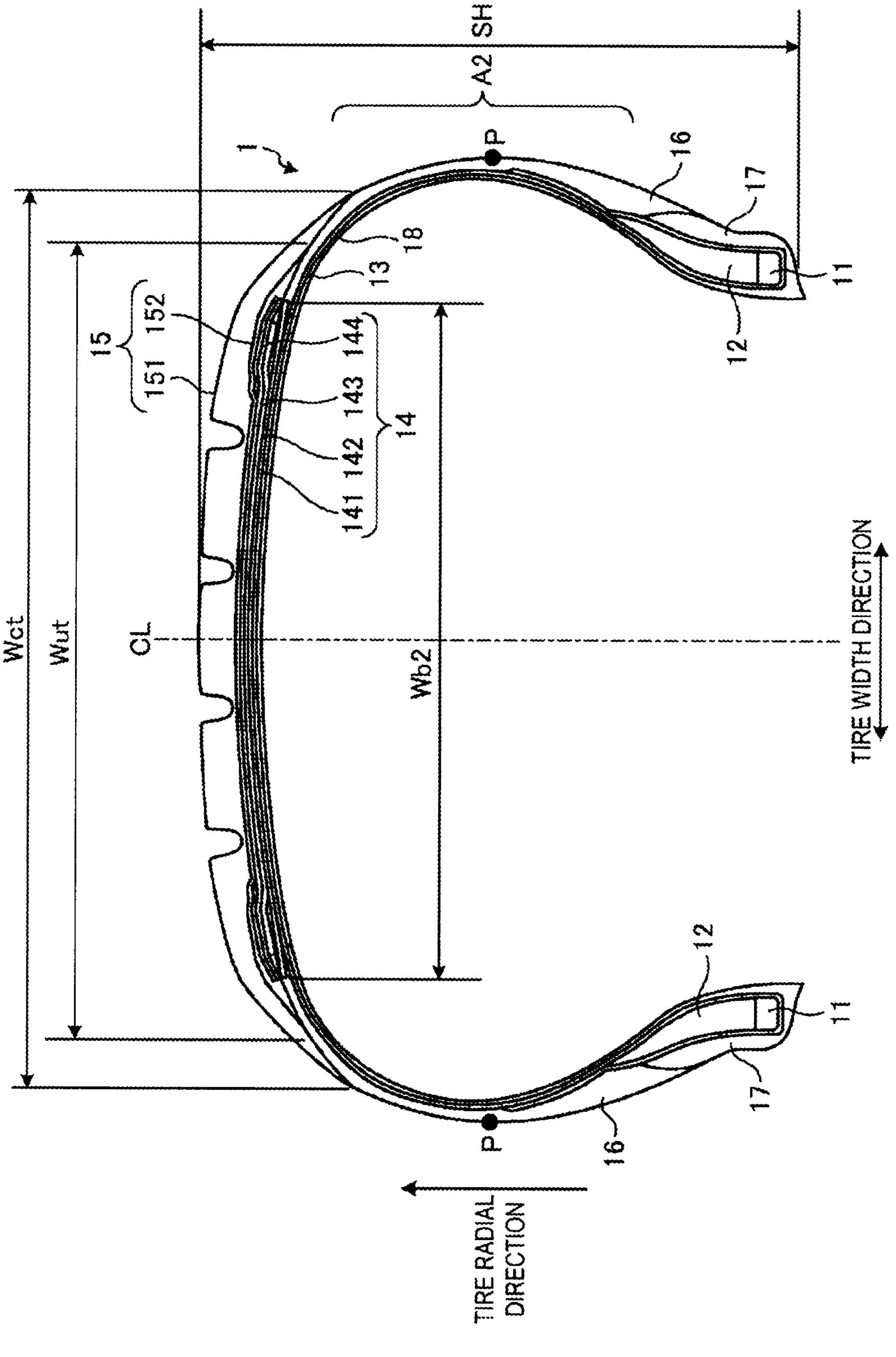
FIG. 1 is a cross-sectional view in a tire meridian direction illustrating a pneumatic tire according to an embodiment of the technology.

FIG. 1 is a cross-sectional view in a tire meridian direction illustrating a pneumatic tire according to an embodiment of the technology. The same drawing illustrates a cross-sectional view of a half region in a tire radial direction. The same drawing also illustrates a radial tire for a passenger vehicle as an example of a pneumatic tire.

In the same drawing, a cross-section in the tire meridian direction is defined as a cross-section of the tire taken along a plane that includes a tire rotation axis (not illustrated). Further, a tire equatorial plane CL is defined as a plane perpendicular to the tire rotation axis through a midpoint between measurement points in a tire cross-sectional width defined by JATMA (The Japan Automobile Tyre Manufacturers Association, Inc.). Additionally, a tire width direction is defined as a direction parallel to the tire rotation axis, and the tire radial direction is defined as a direction perpendicular to the tire rotation axis. Additionally, a point P is a tire maximum width position.

A pneumatic tire 1 includes an annular structure with the tire rotation axis being as the center, and includes a pair of bead cores 11, 11, a pair of bead fillers 12, 12, a carcass layer 13, a belt layer 14, a tread rubber 15, a pair of sidewall rubbers 16, 16, a pair of rim cushion rubbers 17, 17, and an innerliner 18 (see FIG. 1).

The pair of bead cores 11, 11 each include one or more of bead wires made of steel and made by being wound annularly multiple times, and the pair of bead cores 11, 11 are embedded in bead portions and constitute cores of the bead portions of left and right. The pair of bead fillers 12, 12 are respectively disposed on an outer circumference of the pair of bead cores 11, 11 in the tire radial direction and reinforce the bead portions.

The carcass layer 13 includes a single layer structure made of one carcass ply, or a multilayer structure made of a plurality of carcass plies being layered, and the carcass layer 13 extends in a toroidal shape between the bead cores 11, 11 of left and right, and constitutes the backbone of the tire. Additionally, both end portions of the carcass layer 13 are wound and turned back toward an outer side in the tire width direction to wrap the bead cores 11 and the bead fillers 12, and are fixed. Moreover, the carcass ply of the carcass layer 13 is made by covering a plurality of carcass cords made of steel or an organic fiber material (for example, aramid, nylon, polyester, rayon, or the like) with a coating rubber and performing a rolling process on the carcass cords, and has a cord angle (defined as an inclination angle in a longitudinal direction of the carcass cords with respect to a tire circumferential direction) of 80 degrees or more and 100 degrees or less.

Note that in the configuration in FIG. 1, the carcass layer 13 includes a single layer structure formed of a single carcass ply. However, no such limitation is intended, and the carcass layer 13 may include a multilayer structure formed of a plurality of layered carcass plies (not illustrated).

Additionally, in the configuration illustrated in FIG. 1, the carcass layer 13 has a continuous structure in the tire width direction, and intersects with the tire equatorial plane CL and extends to the tire left and right regions. However, no such limitation is intended, and the carcass layer 13 may be formed of a left and right pair of carcass plies and include a divided portion in the tread portion to have a separated structure in the tire width direction (a so-called divided carcass structure) (not illustrated).

The belt layer 14 is made of a plurality of belt plies 141 to 144 being layered, and is disposed around an outer circumference of the carcass layer 13. The belt plies 141 to 144 include a pair of cross belts 141, 142, a belt cover 143, and belt edge covers 144.

The pair of cross belts 141, 142 are made by covering a plurality of belt cords made of steel or an organic fiber material with a coating rubber and performing a rolling process on the belt cords, and each have a cord angle with an absolute value of 15 degrees or more and 55 degrees or less. Further, the pair of cross belts 141, 142 have cord angles (defined as inclination angles in a longitudinal direction of the belt cords with respect to the tire circumferential direction) of opposite signs relative to each other and are layered such that the longitudinal directions of the belt cords intersect each other (so-called crossply structure). Furthermore, the pair of cross belts 141, 142 are disposed layered on an outer side in the tire radial direction of the carcass layer 13.

The belt cover 143 and the belt edge covers 144 are made by covering a plurality of belt cover cords made of steel or an organic fiber material with coating rubber, and each have a cord angle with an absolute value of 0 degrees or more and 10 degrees or less. Additionally, for example, a strip material is formed of one or a plurality of belt cover cords covered with coating rubber, and the belt cover 143 and the belt edge covers 144 are made by winding this strip material multiple times and in a spiral-like manner in the tire circumferential direction around outer circumferential surfaces of the cross belts 141, 142. Additionally, the belt cover 143 is disposed so as to completely cover the cross belts 141, 142, and the pair of belt edge covers 144 and 144 are disposed covering the left and right edge portions of the cross belts 141, 142 from the outer side in the tire radial direction.

The tread rubber 15 is disposed in the outer circumferences in the tire radial direction of the carcass layer 13 and the belt layer 14 and constitutes a tread portion of the tire. Additionally, the tread rubber 15 includes a cap tread 151 and an undertread 152. The cap tread 151 is made of a rubber material that is excellent in ground contact characteristics and weather resistance, and the cap tread 151 is exposed in a tread surface all across a tire ground contact surface, and constitutes an outer surface of the tread portion. The undertread 152 is made of a rubber material that is more excellent in heat resistance than the cap tread 151, and the undertread 152 is disposed being sandwiched between the cap tread 151 and the belt layer 14, and constitutes a base portion of the tread rubber 15.

The pair of sidewall rubbers 16, 16 are disposed on an outer side in the tire width direction of the carcass layer 13 and constitute sidewall portions of left and right, respectively. For example, in the configuration of FIG. 1, the end portion of the sidewall rubber 16 on the outer side in the tire radial direction is disposed in the lower layer of the tread rubber 15 and is sandwiched between the belt layer 14 and the carcass layer 13. However, no such limitation is intended, and the end portion of the sidewall rubber 16 on the outer side in the tire radial direction may be disposed in an outer layer of the tread rubber 15 and exposed in a buttress portion of the tire (not illustrated).

The pair of rim cushion rubbers 17, 17 extend from an inner side in the tire radial direction of the bead cores 11, 11 of left and right and turned back portions of the carcass layer 13 toward the outer side in the tire width direction, and constitute rim fitting surfaces of the bead portions. For example, in the configuration of FIG. 1, an end portion on the outer side in the tire radial direction of the rim cushion rubber 17 is inserted to a lower layer of the sidewall rubber 16, and is disposed being sandwiched between the sidewall rubber 16 and the carcass layer 13.

The innerliner 18 is an air permeation preventing layer disposed on the tire inner surface and covering the carcass layer 13, and suppresses oxidation caused by exposure of the carcass layer 13 and also prevents leaking of the air in the tire. Additionally, the innerliner 18 includes, for example, a rubber composition containing butyl rubber as a main component, a thermoplastic resin, a thermoplastic elastomer composition containing an elastomer component blended with a thermoplastic resin, and the like.

Characteristics of Tire Rubber Member

In the pneumatic tire 1, each rubber member constituting a tire casing has the following configuration in order to ensure wet performance of the tire and reduce rolling resistance under an ordinary ambient temperature and a low ambient temperature.

First, a tan δ value $T0_{ct}$ of the cap tread 151 at 0° C. and a tan δ value $T60_{ct}$ of the cap tread 151 at 60° C. have the relationship $2.00 \le T0_{ct}/T60_{ct} \le 4.38$, preferably have the relationship $3.00 \le T0_{ct}/T60_{ct} \le 4.35$, and more preferably have the relationship $3.10 \le T0_{ct}/T60_{ct} \le 4.31$. Accordingly, the temperature dependency of fuel economy performance of the tire can be reduced while the wet performance of the tire is improved.

A loss tangent tan δ is measured by using a viscoelasticity spectrometer available from Toyo Seiki Seisaku-sho Ltd. at a predetermined temperature, a shear strain of 10%, an amplitude of ±0.5%, and a frequency of 20 Hz.

A tan δ value at 0° C. is an indicator related to the tire performance during traveling on wet road surfaces. Further, a tan δ value at 20° C. is an index assuming a tire temperature during traveling at an ambient temperature of about 10° C., and a tan δ value at 60° C. is an index assuming a tire temperature during traveling at an ambient temperature of about 25° C. Furthermore, a ratio between the tan δ values is an indication of the temperature dependency of the rubber member.

Additionally, a tan δ value $T20_{ct}$ of the cap tread 151 at 20° C. and the tan δ value $T60_{ct}$ of the cap tread 151 at 60° C. have the relationship $1.60 \le T20_{ct}/T60_{ct} \le 1.90$, and preferably have the relationship $1.70 \le T20_{ct}/T60_{ct} \le 1.80$.

Accordingly, a difference between rolling resistance under a low ambient temperature and rolling resistance under an ordinary ambient temperature is reduced, and thus the temperature dependency of the fuel economy performance of the tire is reduced.

Further, the tan δ value T0_ct of the cap tread 151 at 0° C. is in the range T0_ct≤0.75. Furthermore, the tan δ value T20_ct of the cap tread at 20° C. is in the range T20_ct≤0.48. In addition, the tan δ value T60_ct of the cap tread at 60° C. is in the range T60_ct≤0.38. Accordingly, the rolling resistance under a low ambient temperature and a high ambient temperature is reduced while the wet performance of the tire is improved. Note that the lower limits of T0_ct, T20_ct, and T60_ct are not particularly limited, and it is preferable that the lower limits are closer to 0; however, the lower limits are restricted by the ratio conditions described above.

Further, a rubber hardness Hs_ct of the cap tread 151 at 20° C. is in the range 50≤Hs_ct≤75. Furthermore, a modulus of the cap tread 151 at 100% elongation is in the range 1.0 MPa≤E'_ct≤3.5 MPa.

The rubber hardness is measured in accordance with JIS K 6253.

The modulus is measured by a tensile test at a temperature of 20° C. with a dumbbell-shaped test piece in accordance with JIS K6251 (using a number 3 dumbbell).

Additionally, a tan δ value T20 of the rubber member at 20° C. other than the cap tread 151 constituting the tire casing and a tan δ value T60 of the rubber member at 60° C. have the relationship 0.50≤T20/T60≤2.00, preferably have the relationship 0.65≤T20/T60≤1.55, and more preferably have the relationship 0.80≤T20/T60≤1.50.

Specifically, as the rubber member described above, at least one of the bead filler 12, the undertread 152 of the tread rubber 15, the sidewall rubber 16, and the rim cushion rubber 17 satisfies the conditions described above. The detailed conditions for the rubber members will be described below. In addition, for example, the coating rubber of the bead wire of the bead core 11, the coating rubber of the carcass cord of the carcass layer 13, and the coating rubber of the belt cord of the belt layer 14 may satisfy the conditions described above.

In the configuration described above, the ratio T20/T60 of the tan δ value T20 of the rubber member at 20° C. to the tan δ value T60 of the rubber member at 60° C. is properly set, and thus the difference between the rolling resistance under a low ambient temperature and the rolling resistance under an ordinary ambient temperature can be reduced. Accordingly, variations in fuel economy performance of the tire due to changes in ambient temperature (for example, seasonal changes or the like) can be suppressed.

Further, the tan δ value T20 of the rubber member described above at 20° C. is in the range T20≤0.22, and is preferably in the range T20≤0.15. Furthermore, the tan δ value T60 of the rubber member described above at 60° C. is in the range T60≤0.17. Note that the lower limits of T20 and T60 are not particularly limited, and it is preferable that the lower limits are closer to 0; however, the lower limits are restricted by the ratio conditions described above. Accordingly, the rolling resistance under a low ambient temperature is reduced.

Characteristics of Bead Filler

Further, a tan δ value T20_bf of the bead filler 12 at 20° C. and a tan δ value T60_bf of the bead filler 12 at 60° C. have the relationship 0.90≤T20_bf/T60_bf≤1.05, preferably have the relationship 0.91≤T20_bf/T60_bf≤1.04, and more preferably have the relationship 0.92≤T20_bf/T60_bf≤1.03. As a result, the difference between the rolling resistance under a low ambient temperature and the rolling resistance under an ordinary ambient temperature can be reduced.

Furthermore, the tan δ value T20_bf of the bead filler 12 at 20° C. is in the range T20_bf≤0.18, is preferably in the range T20_bf≤0.17, and is more preferably in the range T20_bf≤0.16. Additionally, the tan δ value T60_bf of the bead filler 12 at 60° C. is in the range T60_bf≤0.20. As a result, the rolling resistance under a low ambient temperature and a high ambient temperature is reduced. Note that the lower limits of T20_bf and T60_bf are not particularly limited, and it is preferably that the lower limits are closer to 0; however, the lower limits are restricted by the ratio conditions described above.

Further, the tan δ value T20_bf of the bead filler 12 at 20° C. has the relationship T20_ct×T20_bf≤0.040 with respect to the tan δ value T20_ct of the cap tread 151 at 20° C., and preferably has the relationship of T20_ct×T20_bf≤0.039. Accordingly, the rolling resistance under a low ambient temperature can be appropriately reduced.

Furthermore, the tan δ value T60_bf of the bead filler 12 at 60° C. has the relationship T60_ct×T60_bf≤0.030 with respect to the tan δ value T60_ct of the cap tread 151 at 60° C., preferably has the relationship T60_ct×T60_bf≤0.028, and more preferably has the relationship T60_ct×T60_bf≤0.026. Accordingly, the rolling resistance under an ordinary ambient temperature is properly set.

Additionally, it is preferable that the ratio T20_bf/T60_bf between the tan δ value T20_bf of the head filler 12 at 20° C. and the tan δ value T60_bf of the bead filler 12 at 60° C. has the relationship 0.40≤(T20_bf/T60_bf)/(T20_ct/T60_ct)≤0.60 with respect to the ratio T20_ct/T60_ct between the tan δ value T20_ct of the cap tread 151 at 20° C. and the tan δ value T60_ct of the cap tread 151 at 60° C., and preferably have the relationship 0.45≤(T20_bf/T60_bf)/(T20_ct/T60_ct)≤0.55. In such a configuration, since the tan δ ratio of the rubber member located on the tire ground contact surface side is set bigger than that of the rubber member located on the rim fitting surface side, deformation and vibration of the rubber member during rolling of the tire are efficiently damped from the tire ground contact surface toward the rim fitting surface. As a result, the energy consumption of the entire tire is reduced regardless of the ambient temperature during traveling, and the tire rolling resistance is reduced.

Further, a rubber hardness Hs_bf of the bead filler 12 at 20° C. is in the range 70≤Hs_bf≤97. Furthermore, a modulus of the bead filler 12 at 100% elongation is in the range 1.0 Mpa≤E'_bf≤13.0 MPa.

Additionally, the rubber hardness Hs_bf of the bead filler 12 at 20° C. has the relationship 25≤Hs_bf−Hs_ct≤30 with respect to the rubber hardness Hs_ct of the cap tread 151 at 20° C. In such a configuration, the relationship between the rubber hardnesses of the bead filler 12 and the cap tread 151 is properly set, and the transfer efficiency and responsiveness of steering force from the bead portion to the tire ground contact surface are improved. As a result, the steering stability performance of the tire is improved.

Figure 2:
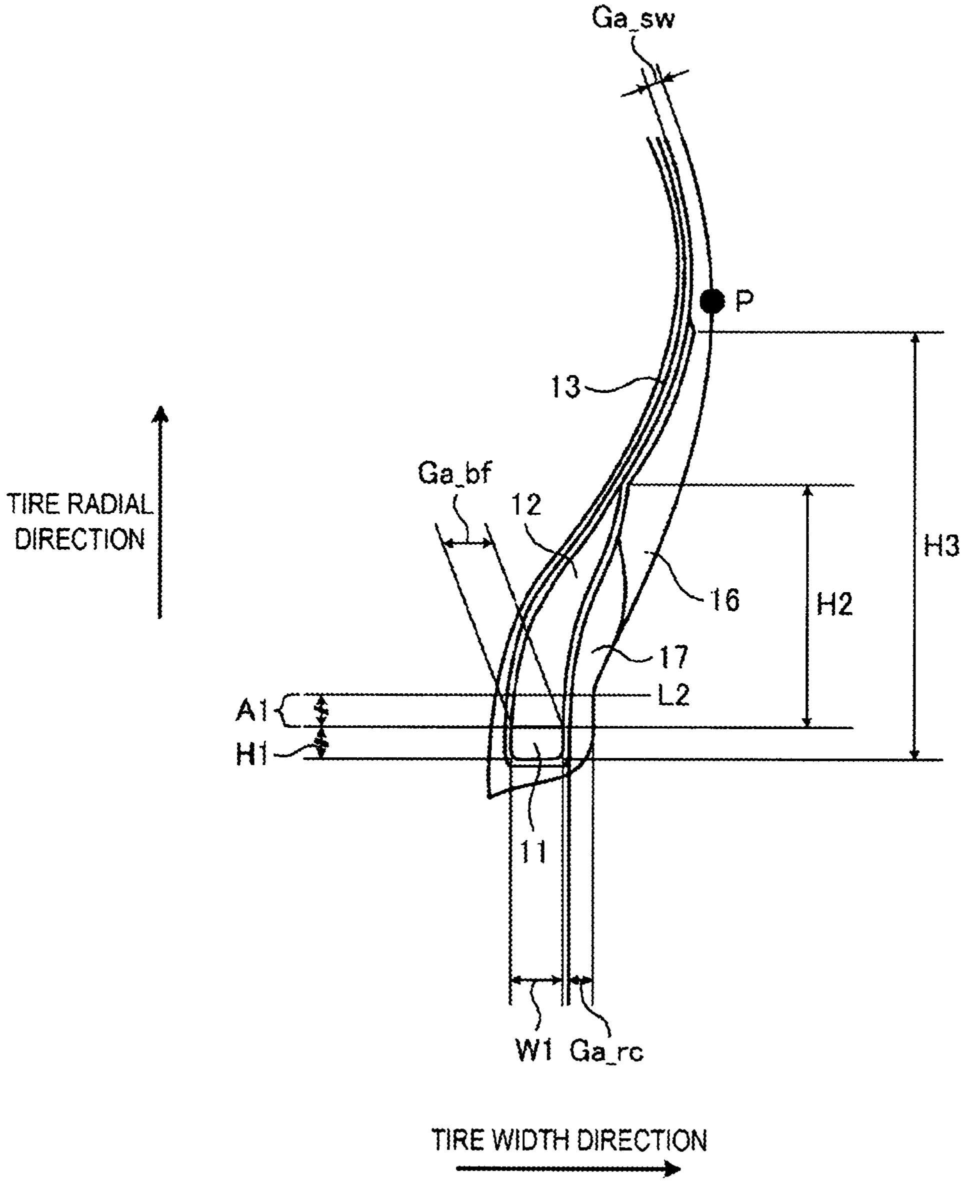
FIG. 2 is an enlarged view illustrating a bead portion of the pneumatic tire illustrated in FIG. 1.

FIG. 2 is an enlarged view illustrating the bead portion of the pneumatic tire 1 illustrated in FIG. 1. In the same drawing, a region A1 in a distance from a top surface of the bead core 11 to a cross-sectional height H1 of the bead core 11 is defined.

At this time, it is preferable that a maximum gauge Ga_bf of the bead filler 12 in the region A1 and the tan δ value T20_bf of the bead filler 12 at 20° C. have the relationship Ga_bf×T20_bf≤0.90, and preferably have the relationship Ga_bf×T20_bf≤0.80. Additionally, the maximum gauge Ga_bf of the bead filler 12 has the relationship $0.90 \le Ga\_bf/W1 \le 1.10$ with respect to a maximum width W1 of the bead core 11. As a result, the energy consumption of the head filler 12 during rolling of the tire is reduced, and the rolling resistance under a low ambient temperature can be reduced.

The maximum gauge Ga_bf of the bead filler 12 is measured as a maximum thickness in the tire width direction when the tire is mounted on a specified rim, inflated to a specified internal pressure, and placed in an unloaded state.

"Specified rim" refers to a "standard rim" defined by JATMA, a "Design Rim" defined by the Tire and Rim Association, Inc. (TRA), or a "Measuring Rim" defined by the European Tyre and Rim Technical Organisation (ETRTO). Additionally, "specified internal pressure" refers to a "maximum air pressure" defined by JATMA, the maximum value in "TIRE LOAD LIMITS AT VARIOUS COLD INFLATION PRESSURES" defined by TRA, or "INFLATION PRESSURES" defined by ETRTO. Additionally, "specified load" refers to a "maximum load capacity" defined by JATMA, the maximum value in "TIRE LOAD LIMITS AT VARIOUS COLD INFLATION PRESSURES" defined by TRA, or "LOAD CAPACITY" defined by ETRTO. However, in JATMA, in the case of a tire for a passenger vehicle, specified internal pressure is an air pressure of 180 kPa, and specified load is 88% of the maximum load capacity at the specified internal pressure.

Further, in FIG. 1, a height H2 of the bead filler 12 preferably has the relationship $0.15 \le H2/SH \le 0.21$ with respect to a tire cross-sectional height SH, and more preferably has the relationship $0.18 \le H2/SH \le 0.20$. Furthermore, at this time, a turned up height H3 of the carcass layer 13 preferably has the relationship $0.15 \le H3/SH$ with respect to the tire cross-sectional height SH, more preferably has the relationship $0.17 \le H3/SH$, and further more preferably has the relationship $0.19 \le H3/SH$.

The height H2 of the bead filler 12 is measured as an extension length of the bead filler 12 in the tire radial direction.

The turned up height H3 of the carcass layer 13 is measured as a distance in the tire radial direction from the radially innermost point of the bead core 11 to the radially outermost point of the turned up portion of the carcass layer 13.

Characteristics of Undertread

Additionally, a tan δ value T20_*ut* of the undertread 152 at 20° C. and a tan δ value T60_*ut* of the undertread 152 at 60° C. have the relationship $0.50 \le T20\_ut/T60\_ut \le 1.55$, preferably have the relationship $0.75 \le T20\_ut/T60\_ut \le 1.50$, and more preferably have the relationship $0.80 \le T20\_ut/T60\_ut \le 1.45$. As a result, the difference between the rolling resistance under a low ambient temperature and the rolling resistance under an ordinary ambient temperature can be reduced.

Further, the tan δ value T20_*ut* of the undertread 152 at 20° C. is in the range $T20\_ut \le 0.15$, and is preferably in the range $T20\_ut \le 0.07$. Furthermore, the tan δ value T60_*ut* of the undertread 152 at 60° C. is in the range $T60\_ut \le 0.30$, and is preferably in the range $T60\_ut \le 0.15$. As a result, the rolling resistance under a low ambient temperature and a high ambient temperature is reduced. Note that it is preferable that the lower limits of T20_*ut* and T60_*ut* are closer to 0; however, the lower limits are restricted by the ratio conditions described above.

Additionally, the tan δ value T20_*ut* of the undertread 152 at 20° C. has the relationship $T0\_ct \times T20\_ut \le 0.087$ with respect to the tan δ value T0_*ct* of the cap tread 151 at 0° C., and preferably has the relationship of $T0\_ct \times T20\_ut \le 0.050$. Accordingly, the rolling resistance under a low ambient temperature can be appropriately reduced.

For the product of the tan δ values, according to the temperature distribution inside the tire during rolling of the tire, the temperature of the cap tread 151 in contact with the road surface tends to be lower than the temperature of the undertread 152. Accordingly, by using the tan δ value at a relatively low temperature for the cap tread 151, the influence of the tan δ value on the rolling resistance under a low ambient temperature can be appropriately evaluated.

Additionally, the tan δ value T60_*ut* of the undertread 152 at 60° C. has the relationship $T40\_ct \times T60\_ut \le 0.024$ with respect to the tan δ value T40_*ct* of the cap tread 151 at 40° C., preferably has the relationship $T40\_ct \times T60\_ut \le 0.020$, and more preferably has the relationship $T40\_ct \times T60\_ut \le 0.015$. As a result, the rolling resistance under a high ambient temperature can be appropriately reduced.

Additionally, it is preferable that the ratio T20_*ut*/T60_*ut* between the tan δ value T20_*ut* of the undertread 152 at 20° C. and the tan δ value T60_*ut* of the undertread 152 at 60° C. has the relationship $0.75 \le (T20\_ut/T60\_ut)/(T20\_ct/T60\_ct) \le 1.00$, with respect to the ratio T20_*ct*/T60_*ct* between the tan δ value T20_*ct* of the cap tread 151 at 20° C. and the tan δ value T60_*ct* of the cap tread 151 at 60° C., and preferably has the relationship $0.78 \le (T20\_ut/T60\_ut)/(T20\_ct/T60\_ct) \le 0.95$.

In the configuration described above, since the tan δ ratio of the rubber member located on the tire ground contact surface side is set bigger than that of the rubber member located on the rim fitting surface side, deformation and vibration of the rubber member during rolling of the tire are efficiently damped from the tire ground contact surface toward the rim fitting surface. As a result, the energy consumption of the entire tire is reduced regardless of the ambient temperature during traveling, and the tire rolling resistance is reduced.

Further, a rubber hardness Hs_ut of the undertread 152 at 20° C. is in the range $55 \le Hs\_ut \le 65$. Furthermore, a modulus of the undertread 152 at 100% elongation is in the range $1.5\ MPa \le E'\_ut \le 3.0\ MPa$.

In addition, the rubber hardness Hs_ut of the undertread 152 at 20° C. has the relationship $1 \le Hs\_ct - Hs\_ut \le 10$ with respect to the rubber hardness Hs_ct of the cap tread 151, preferably has the relationship of $3 \le Hs\_ct - Hs\_ut \le 8$, and more preferably has the relationship $4 \le Hs\_ct - Hs\_ut \le 7$. In such a configuration, since the cap tread 151 is harder than the undertread 152, the steering stability of the tire is improved. In addition, the road surface followability of the undertread 152 is improved, and the wet performance of the tire is improved.

Further, in FIG. 1, a cross-sectional area S_ct of the cap tread 151 and a cross-sectional area S_ut of the undertread 152 in a cross-sectional view in the tire meridian direction have the relationship $0.11 \le S\_ut/(S\_ct+S\_ut) \le 0.50$, preferably have the relationship $0.13 \le S\_ut/(S\_ct+S\_ut) \le 0.45$, and preferably have the relationship $0.15 \le S\_ut/(S\_ct+S\_ut) \le 0.40$. With the lower limit described above, the volume of the undertread 152 having a relatively small tan δ value is ensured, and the effect of reducing the rolling resistance described above is ensured. There is an advantage that the effect of reducing the tire rolling resistance is ensured. With the upper limit described above, the volume of the hard cap tread 151 is ensured, and the effect of improving the steering stability performance of the tire described above is ensured.

The cross-sectional area S_ct of the cap tread 151 and the cross-sectional area S_ut of the undertread 152 are calculated as an average value of the entire circumference of the tire.

Furthermore, in FIG. 1, a maximum width Wb2 of the widest cross belt 142 of the cross belts 141, 142 constituting the belt layer 14, a maximum width Wct of the cap tread 151, and a maximum width Wut of the undertread 152 satisfy 15 mm≤Wct−Wb2≤30 mm and Wb2<Wut<Wet. With the upper limit described above, the maximum width Wb2 of the cross belt 142 is ensured, and the tire rolling resistance is reduced. In addition, with the magnitude relationship described above Wb2<Wut<Wct, the tire durability is ensured.

The maximum width Wb2 of the cross belt 142, the maximum width Wct of the cap tread 151, and the maximum width Wut of the undertread 152 are measured when the tire is mounted on a specified rim, inflated to a specified internal pressure, and placed in an unloaded state.

Figure 3:
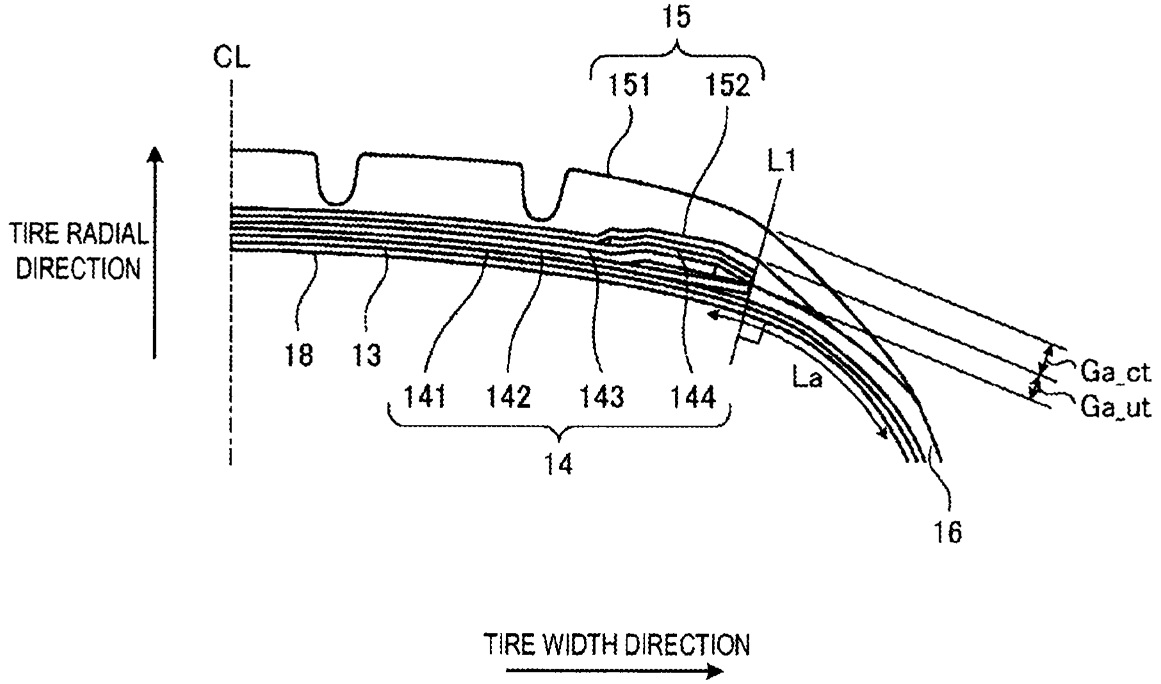
FIG. 3 is an enlarged view illustrating a tread portion of the pneumatic tire illustrated in FIG. 1.

FIG. 3 is an enlarged view illustrating the tread portion of the pneumatic tire 1 illustrated in FIG. 1. In the same drawing, an imaginary line L1 passing through an end portion of the widest cross belt 142 of the cross belts 141, 142 constituting the belt layer 14 and perpendicular to the carcass layer 13 is defined.

At this time, a gauge Ga_ct of the cap tread 151 on the imaginary line L1 and a gauge Ga_ut of the undertread 152 on the imaginary line L1 have the relationship 0.20≤Ga_ut/Ga_ct≤0.40. With the lower limit described above, the volume of the undertread 152 having a relatively small tan δ value is ensured, and the effect of reducing the rolling resistance described above is ensured. With the upper limit described above, the volume of the hard cap tread 151 is ensured, and the effect of improving the steering stability performance of the tire described above is ensured.

Additionally, the cross-sectional area S_ct of the cap tread 151 and the cross-sectional area S_ut of the undertread 152 in a cross-sectional view in the tire meridian direction, and the tan δ value T0_*ct* of the cap tread 151 at 0° C. satisfy 0.20≤{S_ct/(S_ct+S_ut)}×T0_*ct*≤0.60, and preferably satisfy 0.30≤{S_ct/(S_ct+S_ut)}×T0_*ct*≤0.58. With the lower limit described above, the volume of the cap tread 151 is ensured, and the effect of improving the steering stability performance of the tire described above is ensured. With the upper limit described above, the deterioration of the rolling resistance, which is caused when the volume or tan δ value of the cap tread 151 is excessively large, is suppressed.

Additionally, the cross-sectional area S_ct of the cap tread 151 and the cross-sectional area S_ut of the undertread 152 in a cross-sectional view in the tire meridian direction, and the tan δ value T20_*ut* of the undertread 152 at 20° C. satisfy 0.01≤{S_ut/(S_ct+S_ut)}×T20_*ut*≤0.60, and preferably satisfy 0.01≤{S_ut/(S_ct+S_ut)}×T20_*ut*≤0.05. With the upper limit described above, the road surface followability of the undertread 152 is ensured, and the effect of improving the wet performance of the tire described above is ensured. In addition, the deterioration of the steering stability performance of the tire, which is caused when the volume of the relatively soft undertread 152 is excessively large, is suppressed.

Characteristics of Sidewall Rubber

Further, a tan δ value T20_*sw* of the sidewall rubber 16 at 20° C. and a tan δ value T60_*sw* of the sidewall rubber 16 at 60° C. have the relationship 0.50≤T20_*sw*/T60_*sw*≤1.50, preferably have the relationship 0.75≤T20_*sw*/T60_*sw*≤1.45, and more preferably have the relationship 0.80≤T20_*sw*/T60_*sw*≤1.40. As a result, the difference between the rolling resistance under a low ambient temperature and the rolling resistance under an ordinary ambient temperature can be reduced.

Furthermore, the tan δ value T20_*sw* of the sidewall rubber 16 at 20° C. is in the range T20_*sw*≤0.11, and is preferably in the range T20_*sw*≤0.10. Additionally, the tan δ value T60_*sw* of the sidewall rubber 16 at 60° C. is in the range T60_*sw*≤0.22. As a result, the rolling resistance under a low ambient temperature and a high ambient temperature is reduced. Note that the lower limits of T20_*sw* and T60_*sw* are not particularly limited, and it is preferable that the lower limits are closer to 0; however, the lower limits are restricted by the ratio conditions described above.

Additionally, the tan δ value T20_*sw* of the sidewall rubber 16 at 20° C. has the relationship T0_*ct*×T20_*sw*≤0.070 with respect to the tan δ value T0_*ct* of the cap tread 151 at 0° C., preferably has the relationship T0_*ct*×T20_*sw*≤0.65, and more preferably has the relationship T0_*ct*×T20_*sw*≤0.60. Accordingly, the rolling resistance under a low ambient temperature can be appropriately reduced.

For the product of the tan δ values, according to the temperature distribution inside the tire during rolling of the tire, the temperature of the cap tread 151 in contact with the road surface tends to be lower than the temperature of the sidewall rubber 16. Accordingly, by using the tan δ value at a relatively low temperature for the cap tread 151, the influence of the tan δ value on the rolling resistance under a low ambient temperature can be appropriately evaluated.

Further, the tan δ value T60_*sw* of the sidewall rubber 16 at 60° C. has the relationship T40_*ct*×T60_*sw*≤0.024 with respect to the tan δ value T40_*ct* of the cap tread 151 at 40° C., preferably has the relationship T40_*ct*×T60_*sw*≤0.21, and more preferably has the relationship T40_*ct*×T60_*sw*≤0.18. As a result, the rolling resistance under a high ambient temperature can be appropriately reduced.

Further, the ratio T20_*sw*/T60_*sw* of the tan δ value T20_*sw* of the sidewall rubber 16 at 20° C. to the tan δ value T60_*sw* of the sidewall rubber 16 at 60° C. has the relationship 0.70≤(T20_*sw*/T60_*sw*)/(T20_*ct*/T60_*ct*)≤0.90 with respect to the ratio of T20_*ct*/T60_*ct* of the tan δ value T20_*ct* of the cap tread 151 at 20° C. to the tan δ value T60_*ct* of the cap tread 151 at 60° C., and preferably has the relationship 0.75≤(T20_*sw*/T60_*sw*)/(T20_*ct*/T60_*ct*)≤0.85. In such a configuration, since the tan δ ratio of the rubber member located on the tire ground contact surface side is set bigger than that of the rubber member located on the rim fitting surface side, deformation and vibration of the rubber member during rolling of the tire are efficiently damped from the tire ground contact surface toward the rim fitting surface. As a result, the energy consumption of the entire tire is reduced regardless of the ambient temperature during traveling, and the tire rolling resistance is reduced.

Furthermore, the ratio T20_*sw*/T60_*sw* of the tan δ value T20_*sw* of the sidewall rubber 16 at 20° C. to the tan δ value T60_*sw* of the sidewall rubber 16 at 60° C. has the relationship 0.62≤(T20_*bf*/T60_*bf*)/(T20_*sw*/T60_*sw*)≤0.72 with respect to the ratio T20_*bf*/T60_*bf* of the tan δ value T20_*bf* of the bead filler 12 at 20° C. to the tan δ value T60_*bf* of the bead filler 12 at 60° C., and preferably has the relationship 1.40≤(T20_*sw*/T60_*sw*)/(T20_*bf*/T60_*bf*) ≤1.60. Accordingly, the tire rolling resistance is reduced.

Additionally, the ratio T20_*sw*/T60_*sw* of the tan δ value T20_*sw* of the sidewall rubber 16 at 20° C. to the tan δ value T60_*sw* of the sidewall rubber 16 at 60° C. has the relationship 0.90≤(T20_*sw*/T60_*sw*)/(T20_*ut*/T60_*ut*)≤1.10 with respect to the ratio T20_*ut*/T60_*ut* of the tan δ value T20_ut of the undertread 152 at 20° C. to the tan δ value T60_ut of the undertread 152 at 60° C. and preferably has the relationship 0.95≤(T20_sw/T60_sw)/(T20_ut/T60_ut)≤1.05. Accordingly, the tire rolling resistance is reduced.

Further, a rubber hardness Hs_sw of the sidewall rubber 16 at 20° C. is in the range 50≤Hs_sw≤60. Furthermore, a modulus of the sidewall rubber 16 at 100% elongation is in the range 1.0 MPa≤E'_sw≤2.5 MPa.

Additionally, the rubber hardness Hs_sw of the sidewall rubber 16 at 20° C. has the relationship 1≤Hs_ct−Hs_sw≤10 with respect to the rubber hardness Hs_ct of the cap tread 151 at 20° C., preferably has the relationship 3≤Hs_ct−Hs_sw≤8, and more preferably has the relationship 4≤Hs_ct−Hs_sw≤7. In such a configuration, the relationship between the rubber hardnesses of the sidewall rubber 16 and the cap tread 151 is properly set, and the transfer efficiency and responsiveness of steering force from the rim fitting surface to the tire ground contact surface are improved. As a result, the steering stability performance of the tire is improved.

Moreover, the rubber hardness Hs_sw of the sidewall rubber 16 at 20° C. has the relationship 35≤Hs_bf−Hs_sw≤40 with respect to the rubber hardness Hs_bf of the bead filler 12 at 20° C., and preferably has the relationship 36≤Hs_bf−Hs_sw≤39. As a result, the steering stability performance of the tire is improved.

Further, in FIG. 1, a region A2 of 50% of the tire cross-sectional height having a tire maximum width position P as the center is defined.

At this time, a minimum thickness Ga_sw (see FIG. 2) of the sidewall rubber 16 in the region A2 and the tan δ value T20_sw of the sidewall rubber 16 at 20° C. have the relationship Ga_sw×T20_sw≤0.25, preferably have the relationship Ga_sw×T20_sw≤0.23, and more preferably have the relationship Ga_sw×T20_sw≤0.21. As a result, the energy consumption of the sidewall rubber 16 during rolling of the tire is reduced, and the rolling resistance under a low ambient temperature can be reduced. Furthermore, the minimum thickness Ga_sw of the sidewall rubber 16 is in the range 1.5 mm≤Ga_sw≤3.5 mm.

In addition, an overlap La of the tread rubber 15 (specifically, at least one of the cap tread 151 and the undertread 152) with the sidewall rubber 16 is in the range 30 mm≤La≤60 mm. With the lower limit described above, separation of the tread rubber is suppressed. With the upper limit described above, an increase in rolling resistance, which is caused when a portion of the shoulder portion is excessively distorted during rolling of the tire, is suppressed.

The overlap La is measured as a length along the tire inner circumferential surface.

Characteristics of Rim Cushion Rubber

Further, a tan δ value T20_rc of the rim cushion rubber 17 at 20° C. and a tan δ value T60_rc of the rim cushion rubber 17 at 60° C. have the relationship 0.70≤T20_rc/T60_rc≤1.30, preferably have the relationship 0.80≤T20_rc/T60_rc≤1.25, and more preferably have the relationship 0.90≤T20_rc/T60_rc≤1.20. As a result, the difference between the rolling resistance under a low ambient temperature and the rolling resistance under an ordinary ambient temperature can be reduced.

Furthermore, the tan δ value T20_rc of the rim cushion rubber 17 at 20° C. is in the range T20_rc≤0.24, is preferably in the range T20_rc≤0.22, and is more preferably in the range T20_rc≤0.21. Additionally, the tan δ value T60_rc of the rim cushion rubber 17 at 60° C. is in the range T60_rc≤0.31. As a result, the rolling resistance under a low ambient temperature and a high ambient temperature is reduced. Note that the lower limits of T20_rc and T60_rc are not particularly limited, and it is preferable that the lower limits are closer to 0; however, the lower limits are restricted by the ratio conditions described above.

Further, the tan δ value T20_rc of the rim cushion rubber 17 at 20° C. has the relationship T20_ct×T20_rc≤0.070 with respect to the tan δ value T20_ct of the cap tread 151 at 20° C., and preferably has the relationship T20_ct×T20_rc≤0.060. The product described above is an indicator of the rolling resistance under a low ambient temperature.

Furthermore, the tan δ value T20_rc of the rim cushion rubber 17 at 20° C. has the relationship T20_bf×T20_rc≤0.050 with respect to the tan δ value T20_bf of the bead filler 12 at 20° C., and preferably has the relationship T20_bf×T20_rc≤0.040. Accordingly, the rolling resistance under a low ambient temperature can be appropriately reduced.

Additionally, the tan δ value T20_rc of the rim cushion rubber 17 at 20° C. has the relationship T20_ct×T20_sw≤0.06 with respect to the tan δ value T20_sw of the sidewall rubber 16 at 20° C., and preferably has the relationship T20_ct×T20_sw≤0.05. The product described above is an indicator of the rolling resistance under a low ambient temperature.

Further, the tan δ value T60_rc of the rim cushion rubber 17 at 60° C. has the relationship T60_ct×T60_rc≤0.030 with respect to the tan δ value T60_ct of the cap tread 151 at 60° C., preferably has the relationship T60_ct×T60_rc≤0.27, and more preferably has the relationship T60_ct×T60_rc≤0.25. As a result, the rolling resistance under a high ambient temperature can be appropriately reduced.

Furthermore, the tan δ value T60_rc of the rim cushion rubber 17 at 60° C. has the relationship T60_bf×T60_rc≤0.040 with respect to the tan δ value T60_bf of the bead filler 12 at 60° C., and preferably has the relationship T60_bf×T60_rc≤0.030. As a result, the rolling resistance under a high ambient temperature can be appropriately reduced.

Additionally, the tan δ value T60_rc of the rim cushion rubber 17 at 60° C. has the relationship T60_sw×T60_rc≤0.030 with respect to the tan δ value T60_sw of the sidewall rubber 16 at 60° C., and preferably has the relationship T60_sw×T60_rc≤0.020. The product described above is an indicator of the rolling resistance under a low ambient temperature.

Further, the ratio T20rc/T60_rc of the tan δ value T20_rc of the rim cushion rubber 17 at 20° C. to the tan δ value T60_rc of the rim cushion rubber 17 at 60° C. has the relationship 0.55≤(T20_rc/T60_rc)/(T20_ct/T60_ct)≤0.85 with respect to the ratio T20_ct/T60_ct of the tan δ value T20_ct of the cap tread 151 at 20° C. to the tan δ value T60_ct of the cap tread 151 at 60° C., and preferably has the relationship 0.65≤(T20_rc/T60_rc)/(T20_ct/T60_ct)≤0.75.

In the configuration described above, since the tan δ ratio of the rubber member located on the tire ground contact surface side is set bigger than that of the rubber member located on the rim fitting surface side, deformation and vibration of the rubber member during rolling of the tire are efficiently damped from the tire ground contact surface toward the rim fitting surface. As a result, the energy consumption of the entire tire is reduced regardless of the ambient temperature during traveling, and the tire rolling resistance is reduced.

Furthermore, the ratio T20_rc/T60_rc of the tan δ value T20_rc of the rim cushion rubber 17 at 20° C. to the tan δ value T60_rc of the rim cushion rubber 17 at 60° C. has the relationship 1.00≤(T20_rc/T60_rc)/(T20_bf/T60_bf)≤1.40 with respect to the ratio T20_*bf*/T60_*bf* of the tan δ value T20_*bf* of the bead filler 12 at 20° C. to the tan δ value T60_*bf* of the bead filler 12 at 60° C., preferably has the relationship 1.02≤(T20_*rc*/T60_*rc*)/(T20_*bf*/T60_*bf*)≤1.38, and more preferably has the relationship 1.04≤(T20_*rc*/T60_*rc*)/(T20_*bf*/T60_*bf*)≤1.36.

In the configuration described above, since the rubber members constituting the tire side portion to the bead portion have the same temperature dependency, the deformation and vibration of the rubber member during rolling of the tire are efficiently damped from the tire ground contact surface toward the rim fitting surface. As a result, the energy consumption of the entire tire is reduced regardless of the ambient temperature during traveling, and the tire rolling resistance is reduced.

Additionally, the ratio T20_*rc*/T60_*rc* of the tan δ value T20_*rc* of the rim cushion rubber 17 at 20° C. to the tan δ value T60_*rc* of the rim cushion rubber 17 at 60° C. has the relationship 0.85≤(T2_*rc*/T60_*rc*)/(T20_*sw*/T60_*sw*)≤1.15 with respect to the ratio T20_*sw*/T60_*sw* of the tan δ value T20_*sw* of the sidewall rubber 16 at 20° C. to the tan δ value T60_*sw* of the sidewall rubber 16 at 60° C., and preferably has the relationship 0.85≤(T20_*rc*/T60_*rc*)/(T20_*sw*/T60_*sw*)≤1.00. Accordingly, the tire rolling resistance is reduced.

Further, a rubber hardness Hs_rc of the rim cushion rubber 17 at 20° C. is in the range 65≤Hs_rc≤75. Furthermore, a modulus of the rim cushion rubber 17 at 100% elongation is in the range 3.5 MPa≤E'_rc≤6.0 MPa.

Additionally, the rubber hardness Hs_rc of the rim cushion rubber 17 at 20° C. has the relationship 7≤Hs_rc−Hs_ct≤11 with respect to the rubber hardness Hs_ct of the cap tread 151 at 20° C., and preferably has the relationship 8≤Hs_ct−Hs_ct≤10. In such a configuration, the relationship between the rubber hardness of the rim cushion rubber 17 and the cap tread 151 is properly set, and the transfer efficiency and responsiveness of steering force from the rim fitting surface to the tire ground contact surface are improved. As a result, the steering stability performance of the tire is improved.

Further, the rubber hardness Hs_rc of the rim cushion rubber 17 at 20° C. has the relationship 18≤Hs_bf−Hs_rc≤21 with respect to the rubber hardness Hs_bf of the bead filler 12 at 20° C., and preferably has the relationship 19≤Hs_bf−Hs_rc≤21. In such a configuration, the relationship between the rubber hardness of the bead filler 12 and the rim cushion rubber 17 adjacent to each other in the tire width direction is properly set, and the bead portion is continuously deformed in the tire width direction during turning of the vehicle. As a result, the steering stability performance of the tire is improved.

Furthermore, the rubber hardness Hs_rc of the rim cushion rubber 17 at 20° C. has the relationship 17≤Hs_rc−Hs_sw≤20 with respect to the rubber hardness Hs_sw of the sidewall rubber 16 at 20° C. and preferably has the relationship 18≤Hs_rc−Hs_sw≤19. In such a configuration, the relationship between the rubber hardnesses of the sidewall rubber 16 and the rim cushion rubber 17 that constitute the bead portion to the tire side portion is properly set, and the tire side portion is continuously deformed in the tire width direction during turning of the vehicle. As a result, the steering stability performance of the tire is improved.

Further, in FIG. 2, an imaginary line L2 located at a distance of the cross-sectional height H1 of the bead core 11 from the top surface of the bead core 11 and parallel to the tire rotation axis is defined.

At this time, a gauge Ga_rc of the rim cushion rubber 17 on the imaginary line L2 and the tan δ value T20_*rc* of the rim cushion rubber 17 at 20° C. have the relationship Ga_rc×T20_*rc*≤0.80, and preferably have the relationship Ga_rc×T20_*rc*≤0.70. Furthermore, the gauge Ga_rc of the rim cushion rubber 17 is in the range 3.5 mm≤Ga_rc≤4.5 mm. As a result, the energy consumption of the rim cushion rubber 17 during rolling of the tire is reduced, and the rolling resistance under a low ambient temperature can be reduced.

Effect

As described above, the pneumatic tire 1 includes the pair of bead cores 11, 11, the pair of bead fillers 12, 12 disposed on the outer side in the radial direction of the bead cores 11, 11, the carcass layer 13 extending between the bead cores 11, 11, the belt layer 14 disposed on the outer side in the radial direction of the carcass layer 13, the tread rubber 15 including the cap tread 151 and the undertread 152 and disposed on the outer side in the radial direction of the belt layer 14, the pair of sidewall rubbers 16, 16 disposed on the outer side in the tire width direction of the carcass layer 13, and the pair of rim cushion rubbers 17, 17 disposed on the inner side in the radial direction of the bead cores 11, 11 (see FIG. 1). Additionally, the tan δ value T20 of the rubber member at 20° C., which constitutes at least one of the bead filler 12, the undertread 152, the sidewall rubber 16, and the rim cushion rubber 17 and the tan δ value T60 of the rubber member at 60° C. satisfy 0.50≤T20/T60≤2.00 and T20≤0.22.

In such a configuration, (1) the ratio T20/T60 between the tan δ value T20 of the rubber member at 20° C. and the tan δ value T60 of the rubber member at 60° C. is properly set, and thus the difference between the rolling resistance under a low ambient temperature and the rolling resistance under an ordinary ambient temperature can be reduced. Additionally, (2) the tan δ value T20 of the rubber member at 20° C. is in the range described above, and thus the rolling resistance under a low ambient temperature is reduced. As a result, there is an advantage that the tire rolling resistance during traveling under a low ambient temperature can be reduced while variations in fuel economy performance due to changes in ambient temperature are suppressed.

Further, in the pneumatic tire 1, the tan δ value T20 of the rubber member at 20° C. is in the range T20≤0.15. As a result, there is an advantage that the rolling resistance under a low ambient temperature is reduced.

Furthermore, in the pneumatic tire 1, the tan δ value T20_*sw* of the sidewall rubber 16 at 20° C. and the tan δ value T60_*sw* of the sidewall rubber 16 at 60° C. satisfy 0.50≤T20_*sw*/T60_*sw*≤1.50 and T20_*sw*≤0.11. As a result, there is an advantage that the difference between the rolling resistance under a low ambient temperature and the rolling resistance under an ordinary ambient temperature can be reduced. In addition, there is an advantage that the rolling resistance under a low ambient temperature is reduced.

Additionally, in the pneumatic tire 1, the tan δ value T20_*sw* of the sidewall rubber 16 at 20° C. has the relationship T0_*ct*×T20_*sw*≤0.070 with respect to the tan δ value T0_*ct* of the cap tread 151 at 0° C. As a result, there is an advantage that the rolling resistance under a low ambient temperature can be appropriately reduced.

Moreover, in the pneumatic tire 1, the tan δ value T60_*sw* of the sidewall rubber 16 at 60° C. has the relationship T40_*ct*×T60_*sw*≤0.024 with respect to the tan δ value T40_*ct* of the cap tread 151 at 40° C. As a result, there is an advantage that the rolling resistance under a high ambient temperature can be appropriately reduced.

Further, in the pneumatic tire 1, the ratio T20_*sw*/T60_*sw* of the tan δ value T20_*sw* of the sidewall rubber 16 at 20° C. to the tan δ value T60_*sw* of the sidewall rubber 16 at 60° C. has the relationship 0.70≤(T20_*sw*/T60_*sw*)/(T20_*ct*/T60_*ct*)≤0.90 with respect to the ratio of T20_*ct*/T60_*ct* of the tan δ value T20_*ct* of the cap tread 151 at 20° C. to the tan δ value T60_*ct* of the cap tread 151 at 60° C. In such a configuration, since the tan δ ratio of the rubber member located on the tire ground contact surface side is set bigger than that of the rubber member located on the rim fitting surface side, deformation and vibration of the rubber member during rolling of the tire are efficiently damped from the tire ground contact surface toward the rim fitting surface. As a result, there is an advantage that the energy consumption of the entire tire is reduced regardless of the ambient temperature during traveling and thus the tire rolling resistance is reduced.

Furthermore, in the pneumatic tire 1, the ratio T20_*sw*/T60_*sw* of the tan δ value T20_*sw* of the sidewall rubber 16 at 20° C. to the tan δ value T60_*sw* of the sidewall rubber 16 at 60° C. has the relationship 0.62≤(T20_*bf*/T60_*bf*)/(T20_*sw*/T60_*sw*)≤0.72 with respect to the ratio T20_*bf*/T60_*bf* of the tan δ value T20_*bf* of the bead filler 12 at 20° C. to the tan δ value T60_*bf* of the bead filler 12 at 60° C. In such a configuration, since the tan δ ratio of the rubber member located on the tire ground contact surface side is set bigger than that of the rubber member located on the rim fitting surface side, deformation and vibration of the rubber member during rolling of the tire are efficiently damped from the tire ground contact surface toward the rim fitting surface. As a result, the energy consumption of the entire tire is reduced regardless of the ambient temperature during traveling, and the tire rolling resistance is reduced.

Further, in the pneumatic tire 1, the rubber hardness Hs_sw of the sidewall rubber 16 at 20° C. has the relationship 7≤Hs_ct−Hs_sw≤10 with respect to the rubber hardness Hs_ct of the cap tread 151 at 20° C. In such a configuration, the relationship between the rubber hardnesses of the sidewall rubber 16 and the cap tread 151 is properly set, and the transfer efficiency and responsiveness of steering force from the rim fitting surface to the tire ground contact surface are improved. This has the advantage of improving of the steering stability performance of the tire.

Furthermore, in the pneumatic tire 1, the rubber hardness Hs_sw of the sidewall rubber 16 at 20° C. has the relationship 17≤Hs_rc−Hs_sw≤20 with respect to the rubber hardness Hs_rc of the rim cushion rubber 17 at 20° C. In such a configuration, the relationship between the rubber hardnesses of the sidewall rubber 16 and the rim cushion rubber 17 that constitute the bead portion to the tire side portion is properly set, and the tire side portion is continuously deformed in the tire width direction during turning of the vehicle. This has the advantage of improving of the steering stability performance of the tire.

Additionally, in the pneumatic tire 1, the region A2 of 50% of the tire cross-sectional height SH having the tire maximum width position P as the center is defined (see FIG. 1), and the minimum thickness Ga_sw of the sidewall rubber 16 in the region A2 and the tan δ value T20_*sw* of the sidewall rubber 16 at 20° C. have the relationship Ga_sw×T20_*sw*≤0.25. As a result, there is an advantage that the energy consumption of the sidewall rubber 16 during rolling of the tire is reduced and thus the rolling resistance under a low ambient temperature can be reduced.

Moreover, in the pneumatic tire 1, the overlap La of the tread rubber 15 with the sidewall rubber 16 is in the range 30 mm≤La≤60 mm. With the lower limit described above, there is an advantage that separation of the tread rubber is suppressed. With the upper limit described above, there is an advantage that an increase in rolling resistance, which is caused when a portion of the shoulder portion is excessively distorted during rolling of the tire, is suppressed.

Further, in the pneumatic tire 1, the tan δ value T0_*ct* of the cap tread 151 at 0° C. and the tan δ value T60_*ct* of the cap tread 151 at 60° C. have the relationship 2.00≤T0_*ct*/T60_*ct*≤4.38. Accordingly, there is an advantage that the temperature dependency of the fuel economy performance of the tire can be reduced while the wet performance of the tire is improved.

Furthermore, in the pneumatic tire 1, the tan δ value T0_*ct* of the cap tread 151 at 0° C. is in the range T0_*ct*≤0.75. This has the advantage of improving the wet performance of the tire.

Examples

FIGS. 4A-4B include a table showing the results of performance tests of pneumatic tires according to embodiments of the technology.

In the performance tests, (1) rolling resistance performance, (2) wet performance, and (3) steering stability performance were evaluated for a plurality of types of test tires. Additionally, the test tires each having a tire size 195/65R15 are used.

(1) In the evaluation related to rolling resistance, a drum testing machine having a drum diameter of 1707 mm was used, and an internal pressure of 180 kPa and a load of 88% of the maximum load capacity specified by JATMA were applied to the test tire. A rolling resistance coefficient of the test tire was measured at a speed of 80 km/h. In addition, the ordinary temperature rolling resistance is a measurement value at an ambient temperature of 25° C., and the low temperature rolling resistance is a measurement value at an ambient temperature of 10° C. Results of the evaluation are expressed as index values and evaluated with Conventional Example being assigned as the reference (100). In this evaluation, larger values are preferable.

(2) In the evaluation related to wet performance, the test tires are mounted on front and rear wheels of a test vehicle, the engine displacement of which is 1800 cc and which is a front wheel drive vehicle, and the test tires are inflated to an air pressure of 250 kPa (front wheels) and 240 kPa (rear wheels). In addition, the test vehicle was driven on a test course of an asphalt road surface having a water depth of 2 mm, and a braking distance from the speed of 100 km/h was measured. Evaluation was carried out by expressing the measurement results as index values with the results of Conventional Example being defined as the reference (100). In this evaluation, larger values are preferable. Additionally, when the value is 98 or higher, it is apparent that the performance is properly ensured.

(3) In the evaluation related to steering stability performance, the test tires are mounted on front and rear wheels of a test vehicle, the engine displacement of which is 1800 cc and which is a front wheel drive vehicle, and the test tires are inflated to an air pressure of 250 kPa (front wheels) and 240 kPa (rear wheels). In addition, sensory evaluation by a test driver is performed in which the test vehicle is driven three laps on a testing course, one lap of which is 2 km and which is of a dry road surface while changing lanes. Results of the evaluation are expressed as index values and evaluated with Conventional Example being assigned as the reference (100). In this evaluation, larger values are preferable.

The test tires of Conventional Example and Examples have the configuration of FIG. 1, and each rubber member constituting the tire casing has predetermined physical properties.

As can be seen from the test results, the test tires of Examples provide reduced tire rolling resistance and improved wet performance and steering stability performance.

The invention claimed is:

1. A pneumatic tire, comprising:

a pair of bead cores;

a pair of bead fillers disposed on an outer side in a radial direction of the bead cores;

a carcass layer extending between the bead cores;

a belt layer disposed on an outer side in the radial direction of the carcass layer;

a tread rubber comprising a cap tread and an undertread and disposed on an outer side in the radial direction of the belt layer;

a pair of sidewall rubbers disposed on an outer side in a tire width direction of the carcass layer; and a pair of rim cushion rubbers disposed on an inner side in the radial direction of the pair of bead cores, a tan δ value $T20\_sw$ of the sidewall rubbers at 20° C. and a tan δ value $T60\_sw$ of the sidewall rubbers at 60° C. satisfying $0.50 \leq T20\_sw/T60\_sw \leq 1.50$ and $T20\_sw \leq 0.11$.

2. The pneumatic tire according to claim 1, wherein the tan δ value $T20\_sw$ of the sidewall rubbers at 20° C. has a relationship $T0\_ct \times T20\_sw \leq 0.070$ with respect to a tan δ value $T0\_ct$ of the cap tread at 0° C.

3. The pneumatic tire according to claim 1, wherein the tan δ value $T60\_sw$ of the sidewall rubbers at 60° C. has a relationship $T40\_ct \times T60\_sw \leq 0.024$ with respect to a tan δ value $T40\_ct$ of the cap tread at 40° C.

4. The pneumatic tire according to claim 1, wherein a ratio $T20\_sw/T60\_sw$ of the tan δ value $T20\_sw$ of the sidewall rubbers at 20° C. to the tan δ value $T60\_sw$ of the sidewall rubbers at 60° C. has a relationship $0.70 \leq (T20\_sw/T60\_sw)/(T20\_ct/T60\_ct) \leq 0.90$ with respect to a ratio $T20\_ct/T60\_ct$ of a tan δ value $T20\_ct$ of the cap tread at 20° C. to a tan δ value $T60\_ct$ of the cap tread at 60° C.

5. The pneumatic tire according to claim 1, wherein a ratio $T20\_sw/T60\_sw$ of the tan δ value $T20\_sw$ of the sidewall rubbers at 20° C. to the tan δ value $T60\_sw$ of the sidewall rubbers at 60° C. has a relationship $0.62 \leq (T20\_bf/T60\_bf)/(T20\_sw/T60\_sw) \leq 0.72$ with respect to a ratio $T20\_bf/T60\_bf$ of a tan δ value $T20\_bf$ of the bead fillers at 20° C. to a tan δ value $T60\_bf$ of the bead fillers at 60° C.

6. The pneumatic tire according to claim 1, wherein a rubber hardness Hs_sw of the sidewall rubbers at 20° C. has a relationship $1 \leq Hs\_ct - Hs\_sw \leq 10$ with respect to a rubber hardness Hs_ct of the cap tread at 20° C.

7. The pneumatic tire according to claim 1, wherein a rubber hardness Hs_sw of the sidewall rubbers at 20° C. has a relationship $17 \leq Hs\_rc - Hs\_sw \leq 20$ with respect to a rubber hardness Hs_rc of the rim cushion rubbers at 20° C.

8. The pneumatic tire according to claim 1, wherein a region A2 of 50% of a tire cross-sectional height having a tire maximum width position as a center is defined, and a minimum thickness Ga_sw of the sidewall rubbers in the region A2 and the tan δ value $T20\_sw$ of the sidewall rubbers at 20° C. have a relationship $Ga\_sw \times T20\_sw \leq 0.25$.

9. The pneumatic tire according to claim 1, wherein an overlap La of the tread rubber with each of the sidewall rubbers is in a range 30 mm≤La≤60 mm.

10. The pneumatic tire according to claim 1, wherein a tan δ value $T0\_ct$ of the cap tread at 0° C. and a tan δ value $T60\_ct$ of the cap tread at 60° C. have a relationship $2.00 \leq T0\_ct/T60\_ct \leq 4.38$.

11. The pneumatic tire according to claim 1, wherein a tan δ value $T0\_ct$ of the cap tread at 0° C. is in a range $T0\_ct \leq 0.75$.

12. A pneumatic tire, comprising:

a pair of bead cores;

a pair of bead fillers disposed on an outer side in a radial direction of the bead cores;

a carcass layer extending between the bead cores;

a belt layer disposed on an outer side in the radial direction of the carcass layer;

a tread rubber comprising a cap tread and an undertread and disposed on an outer side in the radial direction of the belt layer;

a pair of sidewall rubbers disposed on an outer side in a tire width direction of the carcass layer; and a pair of rim cushion rubbers disposed on an inner side in the radial direction of the pair of bead cores, a tan δ value $T20\_sw$ of the sidewall rubbers at 20° C. and a tan δ value $T60\_sw$ of the sidewall rubbers at 60° C. satisfying $0.50 \leq T20\_sw/T60\_sw \leq 1.50$ and $T20\_sw \leq 0.11$; wherein the tan δ value $T20\_sw$ of the sidewall rubbers at 20° C. has a relationship $T0\_ct \times T20\_sw \leq 0.070$ with respect to a tan δ value $T0\_ct$ of the cap tread at 0° C., a region A2 of 50% of a tire cross-sectional height having a tire maximum width position as a center is defined, and a minimum thickness Ga_sw of the sidewall rubbers in the region A2 and the tan δ value $T20\_sw$ of the sidewall rubbers at 20° C. have a relationship $Ga\_sw \times T20\_sw \leq 0.25$.

13. A pneumatic tire, comprising:

a pair of bead cores;

a pair of bead fillers disposed on an outer side in a radial direction of the bead cores;

a carcass layer extending between the bead cores;

a belt layer disposed on an outer side in the radial direction of the carcass layer;

a tread rubber comprising a cap tread and an undertread and disposed on an outer side in the radial direction of the belt layer;

a pair of sidewall rubbers disposed on an outer side in a tire width direction of the carcass layer; and a pair of rim cushion rubbers disposed on an inner side in the radial direction of the pair of bead cores, a tan δ value $T20\_sw$ of the sidewall rubbers at 20° C. and a tan δ value $T60\_sw$ of the sidewall rubbers at 60° C. satisfying $0.50 \leq T20\_sw/T60\_sw \leq 1.50$ and $T20\_sw \leq 0.11$, a tan δ value T20 of a rubber member at 20° C. and a tan δ value T60 of the rubber member at 60° C. satisfying $0.50 \leq T20/T60 \leq 2.00$ and $T20 \leq 0.22$, the rubber member constituting at least one of the bead fillers or the rim cushion rubbers, and the tan δ value $T60\_sw$ of the sidewall rubbers at 60° C. has a relationship $T40\_ct \times T60\_sw \leq 0.024$ with respect to a tan δ value $T40\_ct$ of the cap tread at 40° C.

* * * * *